United States Patent [19]
Briggs et al.

[11] 3,721,725
[45] March 20, 1973

[54] PROCESS FOR PREPARING POWDER BLENDS

[75] Inventors: Angelis R. Briggs, Wilmington; Thomas J. Maxwell, Newark, both of Del.

[73] Assignee: E. I. du Pont de Nemours and Company, Wilmington, Del.

[22] Filed: Aug. 14, 1970

[21] Appl. No.: 63,942

[52] U.S. Cl. .....................264/6, 264/14, 264/28, 264/101
[51] Int. Cl. ................................................B01j 2/06
[58] Field of Search...........264/13, 14, 28, 23, 6, 101

[56] References Cited

UNITED STATES PATENTS

| | | | |
|---|---|---|---|
| 2,897,600 | 8/1959 | Graham et al. | 34/5 |
| 3,308,217 | 3/1967 | Lowy et al. | 264/117 |
| 3,551,533 | 12/1970 | Monforte et al. | 264/28 |

OTHER PUBLICATIONS

Perry's Chemical Engineers' Handbook, 4th Ed., 1963, McGraw-Hill Book Co., N.Y.

Primary Examiner—Robert F. White
Assistant Examiner—J. R. Hall
Attorney—Herbert M. Wolfson

[57] ABSTRACT

A method of making a homogeneous solid particulate blend of solid initial ingredients involves dissolving in an aqueous solvent a sugar that is sublimable to dryness, a lesser amount of a biological product, and, if the biological product is not sufficiently lubricative, a lubricant; spraying this solution into boiling dichlorodifluoromethane or other fluorocarbon refrigerant; and lyophilizing the resulting frozen droplets. The sugar is usually either mannitol, maltose, lactose, inositol or dextran, or combinations of these sugars. Other sugars in an amount less than the above sugars may also be added to the solution. Less than about 5 percent w/v of an electrolyte may beneficially be added to the solution, as well as other substances, such as acid, base, etc. Ultrasonic waves applied to the fluorocarbon refrigerant in the region where the solution is sprayed increases the freezing rate. Limiting the distribution of sizes of those particles to be tabletted increases the weight homogeneity of the resulting tablets.

14 Claims, No Drawings

PROCESS FOR PREPARING POWDER BLENDS

BACKGROUND OF THE INVENTION

This invention relates to a process of blending a solid biological product with a preponderance of a solid sugar in which the ingredients are dissolved in an aqueous solvent, frozen in the form of droplets in a fluorocarbon refrigerant, and lyophilized to achieve greater homogeneity and stability.

Previous blending methods involved comminuting and commingling the ingredients while in the solid state. This dry-blend technique suffers from many disadvantages, primary amongst which is poor homogeneity. Variations of 20 percent and more can occur in the compositions of these blends. The problem is particularly aggravated when very small amounts of ingredients are mixed with large amounts of others, as in pharmaceuticals, and when the particles of the ingredients have substantially different sizes e.g., powders as opposed to large crystals. Additionally, the process of comminuting and commingling, e.g., by milling, tends to introduce impurities into the blend.

Recently, it has been disclosed that inorganic materials may be blended in substantially equal quantities by dissolving them in water; spraying the resulting solution into refrigerated liquid hexane; and lyophilizing the droplets. This method has serious drawbacks for use with biological products. Unlike inorganic materials, biological products are generally mixed with large amounts of inert ingredients, such as sugars. When dissolved, these organic materials make viscous solutions that are difficult to handle and spray effectively. The large difference in the quantities and characteristics of these organic ingredients limit the degree of homogenization achievable. Furthermore, the commonly used sugars, such as sucrose, dextrose, and glucose, do not "freeze-dry," but at some stage in the lyophilization process, thaw into a syrup which results in concentration gradients, non-homogeneity, and, at times, a product that cannot be dried. Furthermore, the use of hexane is not desirable. Besides being flammable, it denatures and destroys many biological products and its toxicity is a major disadvantage when the final product is to be injested. Also, hexane must be externally chilled, increasing the cost and complexity of the process.

Thus, it is the object of this invention to provide a process for homogeneously blending dry initial ingredients wherein at least one of the ingredients is a biological product and the other is an inert carrier present in a preponderant amount. Other objects will appear hereinafter.

SUMMARY OF THE INVENTION

These objects are accomplished by providing a process wherein the inert carrier is a sugar that is sublimable to dryness, preferably selected from the group of mannitol, maltose, lactose, inositol, and dextran and is dissolved along with the biological product as dry ingredients in an aqueous solvent; droplets of this solution are then frozen by spraying them into a moving bath of a boiling fluorocarbon refrigerant; the frozen droplets are then lyophilized and predetermined portions of the resulting particles are removed. Where tableting is contemplated and where the biological product is insufficiently lubricative, e.g., in the case of enzymes, a water-soluble lubricant may be added to the solution prior to freezing. It may also be desirable to apply ultrasonic waves to the fluorocarbon refrigerant to provide quicker freezing and, hence, increased homogeneity. It has also been found that when an electrolyte is added in an amount less than 5 percent w/v of the solution, sublimation proceeds more rapidly and the resulting biological product degrades less over a given period of time.

When using the process of the present invention, the environment of the biological product may be altered in the final blend by dissolving various substances prior to spraying. Also, when the final blend is to be tabletted, using particles having sizes within certain limits results in tablets with minimal variation in their weights. Specifically, the diameters of the particles should be between 0.010 and 0.017 inch and the coefficient of weight variation should be less than about 1 percent. This desired range may be obtained without resorting to sieving or further processing by selection of appropriate needle size and injection rate into the refrigerant. For any given solution, it has been found that particle size distribution is a function of these two factors.

DETAILED DESCRIPTION OF THE INVENTION

A variety of solid biological substances may be blended with inert carriers by the process of the present invention. One useful class of compounds are the enzymes, such as luciferase, hexokinase, glucose-6-phosphate dehydrogenase, lactate dehydrogenase, and pyruvate kinase. Pharmaceuticals may also be combined in this manner, as well as proteins and other compounds such as luciferin, bovine albumin morpholinopropane sulfonic acid, 2,6-dichlorophenol indophenol (DIP), nicotinamideadeninine-dinucleotide (reduced) (NADH) and nicotinamide-adenine dinucleotide (NAD). In addition, combinations of biological products may be blended with a carrier by the present invention.

The carrier must be sublimable to dryness and non-destructive to the biological product or products with which it is to be combined. Satisfactory carriers include the five sugars, mannitol, maltose, lactose, inositol and dextran. Other sugars, which do not sublime to dryness may constitute a minor part (i.e., less than half) of the carrier. Other requirements for the carrier will be apparent from the situations in which the blends are to be used. For example, if the biological product will be involved in a photometric determination, the carrier must be transparent to the wavelength of radiation used. If the blend is to be used as a pharmaceutical, then the carrier must not interfere with the action of the pharmaceutical or produce any deleterious side effects on the patient.

Proportions of carrier to biological product can vary widely. While the biological product can be present in an amount up to the amount of carrier present, blends have been prepared successfully in which one part biological product was homogeneously combined with 350 parts carrier and more. Another ingredient which may be added to the solution is a glidant or lubricant. This is preferred in order that the final blend can be easily handled, i.e., measured, tabletted, etc., without agglomerating or sticking to the apparatus. Some biological products when used in sufficient amounts, provide adequate lubricating action without additional materials. However, when lesser non-lubricating amounts or when the biological product in any amount is not lubricative, then a glidant or lubricant soluble in the aqueous solvent used and inert to the biological product must be used. Two acceptable lubricants for use with biological products, such as enzymes, are carbowax (polyethylene glycol) and leucine.

Adding an electrolyte to the solution has suprisingly been found to confer several benefits on the process and on the resulting product. The rate of sublimation is increased up to a factor of two or three. The static electricity of the lyophilized droplets is substantially decreased, thereby reducing or, in some cases, eliminating a handling problem usually present in lyophilization. Lastly, the chemical stability of the biological product in the final blend is increased significantly in many instances. It is believed that these benefits result from alteration of the structure of the water around the fluorocarbon refrigerant by the electrolyte.

The electrolyte used must be compatible with the biological product and must not interfere with the subsequent use of the blend. Particular electrolytes found useful include KCl, NaCl, $MgSO_4$, $MgCl_2$, and $(NH_4)_2$SOB4. However, many others would probably perform satisfactorily.

It is preferable not to add more electrolyte than about 5 percent w/v of the solution. An amount significantly greater than that will produce broken pieces of lyophilized droplets making it difficult to handle the product and, upon tableting, produce tablets of varying weight.

A particular advantage of the present invention is the ability to intimately control the local environment of the biological product and thus reduce its degradation. This is manifest in controlling the pH of the final blend by adding an acid, base, or buffer to the solution prior to spraying. For example, an extremely small amount of acid is often found in commercial sugars. In the final blend, this would have a large effect on the pH because of the small amount of water in the blend. This, in turn would cause degradation of the biological product. The adjustment of pH with an electrolyte, e.g., $NaHCO_3$, prior to spraying, will eliminate this problem.

When dissolving the solid ingredients, it is preferable to dissolve the biological product last. This avoids exposing the biological product to excessive pH ranges, light or hypotonic osmotic conditions.

The fluorocarbon refrigerants (sold under the collective trade name Freon by E. I. du Pont de Nemours and Company, Wilmington, Delaware) have many advantages in the present invention, including being non-toxic and non-flammable. The boiling points of these materials are in a useful range. While being sufficiently low to cause quick freezing, the boiling points are not so low that an extensive "vapor barrier" develops around the droplets and slows freezing. Quick freezing is essential to avoid concentration gradients and retain homogeneity. Freon 12, dichlorodifluoromethane with a boiling point of −30°C., has been found particularly suitable in this invention. Other fluorocarbon refrigerants which may also be used include trichlorofluoromethane, chlorotrifluoromethane, tetrafluoromethane, dichlorofluoromethane, chlorodifluoromethane, trifluoromethane, dichlorotetrafluoroethane, chloropentafluoroethane, bromotrifluoromethane, dibromotetrafluoroethane, etc.

The solution is sprayed in a manner such that it has the form of droplets when it reaches the refrigerant. This is accomplished by adjusting the size of the orifice through which it is sprayed and the pressure applied to it. Having the solution freeze as droplets has several advantages. The freezing is quicker with a resultant increase in homogeneity. The final product is in the form of free-flowing spheres with its superior handling characteristics.

To avoid agglomeration of the droplets, the refrigerant should be in motion. Stirring the refrigerant while spraying will accomplish this. The solution may preferably be more vigorously stirred to create a vortex that will force the frozen droplets to the apex of the vortex where they accumulate and where they avoid contact with subsequently sprayed solution.

To aid in the quick-freezing of the solution, ultrasonic waves may be applied to the fluorocarbon refrigerant in the area where the solution is sprayed. While it is not clearly understood why this occurs, the ultrasonic waves are thought either to aid in penetrating whatever minimal vapor barrier surrounds the droplets, or to assist in heat transfer within the droplets themselves.

The frozen droplets are collected and lyophilized in conventional fashion. Specifically, heat is supplied while the droplets are subjected to a vacuum to compensate for the heat of sublimation of the water. The droplets must not be excessively heated to avoid destruction of the biological product. The lyophilization should continue until the droplets are substantially dry particles.

Portions of the particles may be used as they are, i.e., in the form of a free-flowing powder. Alternatively, these portions may be compressed into tablets. In order for each tablet to contain substantially the same amount of biological product, it is essential that the weight of the tablets be similar to each other.

The difference in weight of the tablets is expressed in terms of the coefficient of variation, C.V., which is defined as $$\text{C.V.} = J/\bar{x} \times 100$$

wherein $J$ = standard deviation (for $n$ tablets) $= \left[\frac{(x-\bar{x})^2}{n-1}\right]^{1/2}$ $x$ = weight of one tablet $\bar{x}$ = mean (for "$n$" tablets) $= \Sigma\, x/n$ It is preferred that the C.V. of the weight of the tablets be maintained at less than 1 percent. This is accomplished by controlling the size distribution of the particles that go into the tablets. The following C.V.'s of tablet weights were found for sets of 20 tablets made from particles with the indicated size distributions:

| Particle Sizes | C.V. of Tablet Weights |
|---|---|
| + 20 mesh | 3.8% |
| −20 + 40 mesh | 0.88% |
| −40 + 60 mesh | 0.66% |

| | |
|---|---|
| −60 + 100 mesh | 0.60% |
| All sizes | 2.1% |

The limited size distributions give tablets with the desired homogeneity.

EXAMPLE 1

The following solution is prepared with the NADH (nicotinamide-adenine-dinucleotide, reduced) being added last:

| | |
|---|---|
| 1. Mannitol | 23.000 gms/100 ml. |
| 2. Carbowax | 2.000 |
| 3. Potassium chloride | 0.500 |
| 4. NaHCO$_3$ | 0.115 |
| 5. NADH | 0.570 |
| | 26.185 |

It is desired to incorporate the maximum amount of mannitol into the final solution to achieve maximum bulk density in the product. The mannitol, carbowax, and KCl are dissolved by warming the solution. After cooling to room temperature, NaHCO$_3$ is added followed by NADH. The NaHCO$_3$ must not be added while the solution is warm, for it will then change to Na$_2$CO$_3$ and deleteriously affect the final pH of the product.

A bath of dichlorodifluoromethane refrigerant is stirred at a speed which develops a vortex extending to 50 percent of the depth of the bath. The probe tip of a Branson Sonifier ultrasonic generator is placed one-half to three-fourths inch below the top of the bath, and its power output adjusted to 35 to 40 watts.

The solution, while being continuously stirred to avoid precipitation of the mannitol, is sprayed into the refrigerant bath near the base of the ultrasonic probe tip; and the frozen droplets are continuously collected with a sieve and placed into Teflon coated pans, to a depth not exceeding 2 inches and subjected to a vacuum of less than 400 microns in a standard freeze dryer. The shelves of the freeze dryer are maintained at 75°F. and the temperature of the droplets monitored with a thermistor. When the product temperature equals the shelf temperature, the product is dry. The −20 mesh +80 mesh fraction of the product (0.010 − 0.017 inch diameter) is formed into tablets on a Stokes Rotary Press using the standard feed frame. The resulting tablets are substantially homogeneous from the standpoint of weight (about 50 milligrams) and composition. Their composition follows:

| | % Composition in Dry Product | Milligrams per Tablet |
|---|---|---|
| 1. Mannitol | 87.83 | 43.915 |
| 2. Carbowax | 7.63 | 3.815 |
| 3. Potassium chloride | 1.92 | 0.960 |
| 4. NaHCO$_3$ | 0.44 | 0.220 |
| 5. NADH | 2.18 | 1.090 |
| | 100% | 50.000 |

EXAMPLE 2

The technique described in the previous example is used to prepare a nicotinamide adenine dinucleotide (NAD) tableting blend using the following ingredients:

| | Wt./dL |
|---|---|
| Mannitol | 12.3 gm |
| Polyethylene glycol, PEG | 2.0 gm |
| KCl | 0.5 gm |
| NAD | 10.7 gm |

This solution is sprayed through a 26 gauge needle at 7 to 8 ml per minute into the dichlorodifluoromethane refrigerant to form droplets which are treated substantially as described in Example 1 to provide homogeneous particles.

In carrying out the process of this invention, it has been found that there are optimum ranges of concentrations for materials that may be used in the process. These ranges are given in the following table:

TABLE

Optimum Concentrations

| Components | Minimum Conc. W/V | Maximum Conc. W/V | Other names |
|---|---|---|---|
| Mannitol | 1% | 23% | D-Mannitol; Mannite; Manicol; Mannidex; Diosmol; Osmitrol; Osmosal |
| Maltose | 1% | 95% | 4-O-α-D-glucopyranosyl-D-glucose, malt sugar, maltobiose |
| Lactose | 1% | 10% | 4-O-β-D-galactopyranosyl-D-glucose; malt sugar |
| Inositol | 1% | 14% | Meat sugar, cyclohexitol, i-inositol, meso-inositol |
| Luciferase | 0.001% | 95% Sat. | |
| Hexokinase | 0.001% | 95% Sat. | |
| G-6-PDH | 0.001% | 95% Sat. | Glucose-6-phosphate dehydrogenase |
| LDH | 0.001 | 95% Sat. | Lactate dehydrogenase |
| Pyruvate kinase | 0.001% | 95% Sat. | |
| Bovine Albumin | 0.4% | 20% | |
| MOPS | 0.1% | 90% Sat. | Morpholinopropane Sulfonic Acid |
| Luciferin | 0.05% | 90% Sat. | |
| DIP | 0.01% | 5% | 2,6-dichlorophenol indophenol |
| NADH | 0.1% | 5% | Nicotinamide-adenine-dinucleotide, reduced |
| NAD | 0.05% | 5% | Nicotinamide-adenine-dinucleotide |
| KCl | 0.1% | 5% | Potassium chloride |
| NaHCO$_3$ | 0.05% | 5% | Sodium bicarbonate |
| (NH$_4$)$_2$SO$_4$ | 0.05% | 5% | Ammonium sulfate |
| PEG | 1% | 10% | Polyethylene glycol, 6000 |

What is claimed is:

1. A method of blending solid particles of a sugar and particles of a solid material into a resulting mixture of particles each having a homogeneous composition the same as the relative amounts of the initially blended sugar and solid material, comprising:

a. dissolving in an aqueous solution particles of a sugar capable of being dried by solute evaporation to a dry condition through sublimation, and particles of a solid material with which said sugar and said aqueous solution are compatable, said material being compatible with said sugar and said aqueous solution, and said aqueous solution and said sugar being compatible with each other;

b. spraying said solution as droplets into a moving bath of boiling fluorocarbon refrigerant having a temperature below about −20° C. to freeze said droplets, c. applying a vacuum to said frozen droplets to cause substantially all the water as ice in said droplets to sublime therefrom and form dry particles of said homogeneous composition having the same relative amounts of initially blended sugar and said material, and d. allowing said particles to come to room temperature and pressure.

2. The method of claim 1 wherein said sugar is at least one selected from the group consisting of mannitol, maltose, lactose, inositol, and dextran, and said solid material is a solid biological product.

3. The method of claim 2 wherein said solid biological product is selected from the group consisting of luciferin, bovine albumin, morpholinopropane sulfonic acid, 2,6-dichlorophenol indophenol, nicotinamide-adenine-dinucleotide (reduced), and nicotin amide-adenine-dinucleotide.

4. The method of claim 2 wherein said fluorocarbon refrigerant is selected from the group consisting of dichlorodifluoromethane, trichlorofluoromethane, chlorotrifluoromethane, tetrafluoromethane, dichlorofluoromethane, chlorodifluoromethane, trifluoromethane, dichlorotetrafluoroethane, chloropentafluoroethane, bromotrifluoromethane and dibromotetrafluoroethane.

5. The method of claim 4 wherein said fluorocarbon refrigerant is dichlorodifluoromethane.

6. The method of claim 2 wherein a water-soluble lubricant is included in said solution in a concentration less than about 10 percent w/v of said solution.

7. The method of claim 6 wherein, prior to the spraying step, an amount of an electrolyte compatible with said biological product, said sugar, and said solvent is dissolved in said solution, said amount of said electrolyte being less than about 5 percent w/v of said solution.

8. The method of claim 7 wherein said electrolyte is selected from the group consisting of KCl, NaCl, MgSo$_4$, MgCl$_2$, and (NH$_4$)$_2$SO$_4$.

9. The method of claim 6 wherein several predetermined portions, having similar weight to each other, of particles are removed and formed into tablets, and wherein the diameter of said particles in said portions are a. substantially all greater than 0.01 inch; and
b. within a range such that the coefficient of variation of the weight of said tablets is less than about 1 percent.

10. The method of claim 9 wherein substantially all of said diameters are less than 0.017 inch.

11. The method of claim 6 wherein said biological product is an enzyme selected from the group consisting of luciferase, hexokinase, glucose-6-phosphate dehydrogenase, lactate dehydrogenase, and pyruvate kinase.

12. The method of claim 11 wherein said water-soluble lubricant is selected from the group consisting of carbowax and leucine.

13. The method of claim 11 wherein said sugar and said lubricant are dissolved in said aqueous solvent prior to dissolving said biological product and, prior to dissolving said biological product, a pH-controlling substance selected from the group consisting of acids, bases and buffers is added to said solution to adjust to pH to within a range of about 3 to 10.

14. The method of claim 13 wherein:
a. prior to adding said pH-controlling substance, an amount of an electrolyte selected from the group consisting of KCl, NaCl, MgSo$_4$, MgCl$_2$, and (NH$_4$)$_2$SOB4 is dissolved in said solvent, said amount being less than 5 percent w/v of said solution;
b. said lubricant is selected from the group consisting of carbowax and leucine; and
c. said biological product is selected from the group consisting of luciferase, hexokinase, glucose-6-phosphate dehydrogenase, lactate dehydrogenase and pyruvate kinase.

* * * * *